Patented May 19, 1953

2,639,276

UNITED STATES PATENT OFFICE 2,639,276

ORGANOPOLYSILOXANES OF IMPROVED ADHESION CONTAINING PEROXIDES

Robert Smith-Johannsen and Curtis S. Oliver, Schenectady, N. Y., assignors to General Electric Company, a corporation of New York No Drawing. Application November 21, 1950, Serial No. 196,944

15 Claims. (Cl. 260—37)

1

This invention is concerned with organopolysiloxanes particularly silicone rubbers having improved adhesion to solid surfaces. More particularly, the invention relates to a composition of matter comprising (1) a titanium dioxide-filled organopolysiloxane convertible, e. g., by heat, to the solid, elastic state, (2) a cure accelerator for (1), and (3) less than 0.5%, by weight, based on the weight of the organopolysiloxane, of an organic peroxide compound (so identified hereinafter in the specification and claims) selected from the class consisting of ditertiary butyl diperphthalate, tertiary butyl hydroperoxide, dipersuccinic acid, ditertiary butyl diperadipate, and ditertiary butyl dipersuccinate, the said mixture of ingredients having an improved adhesion to various solid surfaces over the same composition in which the organic peroxide compound is omitted.

One of the objects of this invention is to improve the adhesion of certain silicone rubbers to various surfaces so as to give a bond at least as strong as the cohesive forces of the silicone rubber itself.

Another object of this invention is to improve the adhesion of silicone rubbers to various metals and siliceous surfaces, such as glass and ceramics.

A still further object of this invention is to permit organopolysiloxanes containing titanium dioxide as a filler, the said organopolysiloxanes being convertible to the solid elastic state, to be bonded easily and quickly to metal, glass, ceramic, synthetic plastic surfaces, etc., so as to obtain a bonding zone without the necessity of using special treatments or primers, which is highly resistant to deterioration at elevated temperatures and capable of remaining flexible at very low temperatures.

Other objects of this invention will become more apparent as the description thereof proceeds.

Because of the relatively inert properties of silicone rubbers, it has been difficult to adhere the latter materials to many solid surfaces. Heretofore the only way known has been to prime the surface to which it is desired to adhere the silicone rubber with a priming agent, and thereafter apply the silicone rubber in the uncured state to the said primed surface. Thus, in copending Smith-Johannsen application Serial No. 77,045, filed February 17, 1949 (now United States Patent 2,601,337 issued June 24, 1952) and assigned to the same assignee as the present invention, there are disclosed and claimed methods for improving the adhesion of various organopolysiloxanes to different types of surfaces by first priming the surface with a disilane corresponding to the general formula $(R)_nSi_2(X)_{6-n}$ where R is a monovalent hydrocarbon radical, X is a halogen, and $n$ is an integer equal to from 1 to 4, prior to applying the organopolysiloxane to the surface. In another application of one of us, namely, Robert Smith-Johannsen, Serial No. 190,241, filed October 14, 1950, and assigned to the same assignee as the instant invention, there is disclosed and claimed a method for adhering organopolysiloxanes convertible to the solid elastic state by first priming the surface to which the organopolysiloxane is to be adhered with a composition comprising a hydrolyzable organosilicate compound corresponding to general formula:

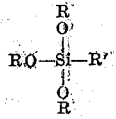

where R and R' are each certain organic groups or halogenated organic groups. Thereafter, the heat-convertible organopolysiloxane, in this case one containing less than 0.2 mol percent copolymerized mono-organosiloxane, is then capable of being adhered to the treated surface by merely applying the organopolysiloxane thereto and effecting curing of the organopolysiloxane by the application of heat.

Although prior techniques for adhering silicone rubber to various surfaces have been satisfactory, it has been desirable to find some way whereby the preliminary steps of preparing a surface for priming and thereafter priming it could be eliminated. Up till now, in order to use primers properly, in many instances, it has been necessary to clean the surface to which the silicone rubber is to be adhered, to inhibit corrosion of the surface in the case of some of the metals, to prime it thereafter with the proper priming agent, and generally washing and drying the surface to remove any traces of materials which may be deleterious to the bond between the surface and the silicone rubber. In addition, even with these many steps the techniques required vary in many cases from surface to surface, and vary even among priming agent.

We have now discovered a means of incorporating all the desired adhesive properties in the uncured organopolysiloxane convertible to the solid elastic state, thus making unnecessary all the special surface treatments and preliminary preparation of the surface prior to adhering the organopolysiloxane. More particularly, we have discoverd that the incorporation of a small amount of a particular organic peroxide compound selected from the class consisting of ditertiary butyl diperphthalate, tertiary butyl hydroperoxide, diperscuccinic acid, ditertiary butyl diperadipate, and ditertiary butyl dipersuccinate, in the organopolysiloxane together with the cure accelerator which is different from the organic peroxide compound and which may be, for instance, benzoyl peroxide, tertiary butyl perbenzoate, etc., permits adhesion of the organopolysiloxane to various surfaces without the necessary preliminary preparing and priming of the surface with priming agents. This effect was specific to the five organic peroxide compounds, and attempts to use similar organic peroxide compounds were unsuccessful. We have found that the amount of the adhesive-inducing organic peroxide compounds mentioned above is critical and if too large an amount is employed, instead of having adhesion, the silicone rubber acts as though some release or lubricating agent had been incorporated therein, due to what is believed an inhibition of the cure. Moreover, we have also found that the incorporation of one or more of the five organic peroxides mentioned above is only effective in improving the adhesion of organopolysiloxanes which contain titanium dioxide as a filler. Organopolysiloxanes using fillers other than titanium dioxide in combination with the cure accelerator and the organic peroxide compounds mentioned above show no improved adhesion and actually exhibit mold release properties, and thus poorer adhesion over the same composition in which the organic peroxide compound is omitted.

That the incorporation of one or more of these five organic peroxides in small amounts could affect the adhesion properties was entirely unexpected and in no way could have been predicted. In this connection, we are not unmindful of Jones Patent 2,448,530, issued September 7, 1948, which discloses some of the organic peroxide compounds mentioned above but lists these compounds as alternative cure accelerators in place of benzoyl peroxide. There is no disclosure or teaching in this patent that the combination of a cure accelerator and these organic peroxide compounds can improve the adhesion of the organopolysiloxanes. As a matter of fact it has been found that some of the organic peroxides, particularly those with which our invention is concerned and which are specifically mentioned in the Jones patent, when employed alone as cure accelerators for the organopolysiloxane develop a much poorer degree of vulcanization or cure over that attained using, e. g., benzoyl peroxide. Moreover, the Jones patent teaches that these particular organic peroxide compounds are used in amounts equivalent to that in which the alternative cure accelerator, benzoyl peroxide is employed, which according to the examples in the patent comprise about 2 to 3% of the heat-convertible organopolysiloxane. To use such amounts in our invention would, as pointed out above, lead to no improvement in adhesive properties and would give an inferior product having poor physical properties.

In order to avoid any question as to the structure of the organic peroxide compounds with which the present invention is concerned, the following is a list of the formulas for these organic peroxides which have been found exclusively able to impart improved adhesion of the silicone rubbers to various surfaces:

Ditertiary butyl diperphthalate

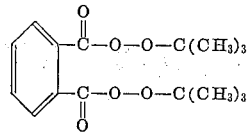

Tertiary butyl hydroperoxide $C(CH_3)_3—O—OH$

Dipersuccinic acid

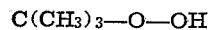

Ditertiary butyl diperadipate

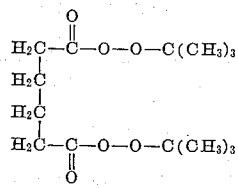

Ditertiary butyl dipersuccinate

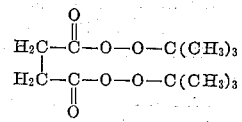

The foregoing organic peroxides are necessarily employed in a relatively small amount as compared to the amount of the cure accelerator or vulcanizing agent used to effect conversion of the organopolysiloxane to the heat-converted, solid elastic state. Based on the weight of the organopolysiloxane, we may employ up to 0.5 percent, by weight of the organic peroxide, preferably from about 0.001 to 0.05 per cent. Amounts in excess of 0.5 per cent when used with the cure accelerator have a deleterious effect on the product and on the adhesion of the organopolysiloxane. The claimed compositions of matter employ the combination of a cure accelerator other than the organic peroxide compound and the organic peroxide compound itself. The cure accelerators known heretofore when employed alone, for example, benzoyl peroxide or tertiary butyl perbenzoate, do not have any effect on the adhesion of the organopolysiloxane. Also, we have found that little, if any, vulcanizing influence is imparted by using any of the five organic peroxides alone as vulcanizing agents or cure accelerators for the organopolysiloxane. Finally, the combination of the cure accelerator and the organic peroxide compound (or compounds) has the added advantage of unexpectedly increasing the rate of cure or vulcanization of certain organic polysiloxanes, particularly those containing increased amounts of copolymerized mono-organopolysiloxanes, e. g., from 0.3 to 0.4 mol per cent copolymerized monomethylsiloxane.

In the specification and in the claims, for brevity, the convertible organopolysiloxane, which may be a highly viscous mass or a gummy, elastic solid, depending on the state of condensation, will hereinafter be referred to as "convertible organopolysiloxane" or more specifically as "convertible methylpolysiloxane."

Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756, issued September 7, 1948, in Sprung et al. Patent 2,448,556, issued September 7, 1948, in Sprung Patent 2,484,595, issued October 11, 1949, in Krieble et al. Patent 2,457,688, issued December 28, 1948, Hyde Patent 2,490,357, issued December 6, 1949, and in Marsden Patent 2,521,528, issued September 5, 1950.

It will of course be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals), connected to the silicon atoms by carbon-silicon linkages, may be employed without departing from the scope of the invention. The particular convertible organopolysiloxane used is not critical and may be any of those described in the foregoing patents which are generally obtained by condensation of a liquid organopolysiloxane containing an average from about 1.95, preferably from about 1.98, to about 2.2 organic groups per silicon atom. The usual condensing agents are those well known in the art and may include for instance ferric chloride hexahydrate, phenyl phosphoryl chloride, alkaline condensing agents, such as, potassium hydroxide, sodium hydroxide, etc.

These convertible organopolysiloxanes generally comprise polymeric diorganosiloxanes containing at most 5 mol per cent, preferably at most 2 mol per cent copolymerized mono-organosiloxane, for example, copolymerized monomethylsiloxane. Generally we prefer to use as the starting liquid organopolysiloxane from which the convertible (for example heat-convertible) organopolysiloxane is prepared, one which contains about 1.995 to 2.0, inclusive, organic groups, for example, methyl groups, per silicon atom and where more than about 95%, preferably, 99% of the silicon atoms in the polysiloxane contain two silicon-bonded organic groups, for instance, alkyl groups, for example, methyl groups, etc.

The effective cure accelerators which may be employed together with the five organic peroxide compounds mentioned above may be one of the several now well known in the art, for instance, benzoyl peroxide and tertiary butyl perbenzoate. These cure accelerators may be present in amounts ranging from about 0.5 to as high as 4 to 8 per cent, preferably from about 1 to 4 per cent, by weight, based on the weight of the organopolysiloxane.

The amount of titanium dioxide used may also vary depending on the particular cure accelerator and organic peroxide compound employed, the application for which the heat-converted, solid, elastic product is intended, the particular organopolysiloxane used, etc. Generally the titanium dioxide may be present in amounts varying, for example, by weight, from about 75 to about 225 parts of the titanium dioxide per 100 parts of the convertible organopolysiloxane. It will of course be apparent to those skilled in the art that larger or smaller ratios of the titanium dioxide may also be employed and that the amount of titanium dioxide used is not critical in the practice of our invention.

Generally, the method whereby the claimed compositions of matter may be prepared are well known in the art. For the most part the convertible organopolysiloxane, filler, cure accelerator, and one or more of the organic peroxide compounds mentioned above are advantageously mixed together on rubber compounding rolls until a homogeneous mixture or sheet is obtained, depending on whether the convertible organopolysiloxane used is in the form of a viscous mass or solid elastic product. The mixture is advantageously allowed to age, e. g., by standing at room temperature, for about 24 to 48 hours prior to using it. Thereafter, the mixture is applied in any desired thickness to the solid surface to which adhesion is desired. It will be found that mere application of the organopolysiloxane to the respective surface will result in marked pressure-sensitive adhesion between the surface and the convertible organopolysiloxane. Thereafter, the total assembly may be subjected to a heat-curing operation, preferably under pressure, for example, at temperatures ranging from about 100° to 200° C. for varying lengths of time depending upon the temperatures used, for instance, from about a few seconds to 25 or several hours. This will generally convert the organopolysiloxane to a solid elastic product which may then be further heat-treated at higher temperatures of the order of from about 200° to 250° C. for longer periods of time, for example, for about 1 to 24 hours in order to obtain the ultimate physical properties in the heat-cured, solid, elastic product.

In addition to effecting adhesion of the finally cured, solid, elastic organopolysiloxane or silicone rubber to many surfaces as, for example, porcelain enamel, glass, aluminum, steel, copper, various plastics, such as, for example, polymeric monochlorotrifluoroethylene polymers, we have also found that certain additional improvements in the properties of the organopolysiloxane itself are also obtained. Thus, it has been found that improvements in softness and strength over regularly cured organopolysiloxanes in which the organic peroxide compounds are omitted result from using these organic peroxides.

In order that those skilled in the art may better understand how the present invention may be practiced, the following examples are given by way of illustration and not by way of limitation. All parts are by weight.

*Example I*

In this example, a heat-convertible compound was prepared by mixing together 66 parts titanium dioxide, 33 parts of a heat-curable solid, elastic methylpolysiloxane containing an average of about 1.996 methyl groups per silicon atom and obtained by condensing with ferric chloride hexahydrate a liquid methyl polysiloxane containing approximately 1.996 methyl groups per silicon atom, 0.66 part benzoyl peroxide, and 0.01 part ditertiary butyl diperphthalate. This silicone gum adhesive was applied to the surface of a degreased copper surface and pressed under light pressure (about 10 to 25 p. s. i.) for 10 minutes at about 150° C. Thereafter, the total assembly was removed from the press and subjected to further heat treatment at about 200° C. for 24 hours. At the end of this time it was found that the bond between the silicone rubber and the copper surface was as strong as the cured silicone rubber itself and attempts to remove the silicone rubber from the copper surface resulted only in tearing of the silicone rubber itself. When the same heat-convertible silicone rubber adhesive minus the ditertiary butyl diperphthalate was applied to the copper and treated in the same fashion as above, after the final heat treatment it was found that there was no adhesion between the cured silicone rubber and the copper, and the silicone rubber could be peeled easily from the surface thereof.

*Example II*

In this example, each of the five organic peroxide compounds mentioned above was incorporated in a silicone adhesive paste comprising 50 parts titanium dioxide, 50 parts of hydrolyzed dimethyldichlorosilane containing about 0.35 to 0.4 mol per cent methyltrichlorosilane (the hydrolysis product being condensed with 0.2 per cent, by weight, ferric chloride, based on the weight of the oily hydrolysis product, until a highly viscous methylpolysiloxane was obtained), and 1.5 parts benzoyl peroxide. This adhesive paste was applied to surfaces such as steel, copper, glass, aluminum, and porcelain enamel in about a 5-mil thickness, and aluminum foil was applied over the adhesive. Thereafter each of the assemblies was heat treated in the same manner as described above in Example I. The amounts of organic peroxide in the formulations were varied for all the surfaces and the following table shows the optimum percentages of each of the organic peroxide compounds used in the various examples.

TABLE

| Organic Peroxide | Percent Based on Convertible Organopolysiloxane |
|---|---|
| Ditertiary butyl diperphthalate | 0.03 |
| Tertiary butyl hydroperoxide | 0.15 |
| Dipersuccinic acid | 0.15 |
| Ditertiary butyl diperadipate | 0.3 |
| Ditertiary butyl dipersuccinate | 0.3 |

In each case regardless of the under surface, after heat treatment of the total assembly, i. e., of the solid surface and the filled heat-convertible methyl polysiloxane, there was obtained a satisfactory bond between the surface and the solid elastic organopolysiloxane. The aluminum foil was also well adhered and formed an integral part of each assembly. The ditertiary butyl diperphthalate appeared to give the best and most consistent results with all the surfaces tried.

*Example III*

Cured silicone rubber was adhered to a ferrous surface by means of the silicone adhesive paste described in Example II using ditertiary butyl diperphthalate only if a small amount of aluminum powder in an amount equal to from about 2 to 10 per cent, by weight, based on the weight of the total adhesive paste was incorporated. Thereafter it was found desirable to use a higher curing temperature, for example, about 200° C. initially in order to effect a satisfactory bond between the metal and the cured silicone rubber. Aluminum powder was not required to effect a satisfactory bond when tertiary butyl hydroperoxide was employed in place of the ditertiary butyl diperphthalate.

We may employ other convertible organopolysiloxanes of the various types described previously in the different patents mentioned heretofore. In addition the particular heat convertible organopolysiloxane, besides having been condensed by means of ferric chloride hexahydrate, may also have been condensed by other condensing agents many examples of which also have been given above. Moreover other cure accelerators in addition to the one employed in the foregoing examples may also be employed, and in other concentrations thereof, for instance, in amounts ranging from 0.5 to 4 to 6 per cent, by weight, based on the weight of the convertible organopolysiloxane may be used.

Our invention is applicable for adhering the convertible organopolysiloxanes to other glass surfaces, for example, glass tape, glass fibers, glass fiber sheets, etc. In the latter instance, glass cloth made from glass fibers may be coated with the compositions of matter herein described and thereafter heated to effect curing of the convertible organopolysiloxane without further priming or pretreatment. The bond realized in such cases is as strong as the silicone rubber thereto adhered, and does not depend on penetration of the adhesive into the pores of the cloth for the proper bond. Our invention is also useful in connection with almost all metal surfaces and is not specific as regards the particular metal to which adhesion may be desired.

The present invention is useful in adhering silicone rubbers to various metal surfaces as well as to various siliceous, for example, glass or ceramic surfaces. Electrical conductors such as copper conductors, can be coated with these claimed compositions of matter merely by extrusion of the filled and modified heat-convertible organopolysiloxane and thereafter passed through an oven and cured at elevated temperatures to give a tightly adherent insulating coating. In addition, it is possible to make seals with various types of equipment including vacuum seals for pumpless power rectifiers, seals in steam irons, etc. Our invention is adaptable for sealing the casings containing anodes and cathodes found in electrical discharge devices.

Our invention obviates the necessity of using large amounts of benzoyl peroxide to obtain a satisfactory bond and also permits the use of easily prepared convertible polysiloxanes. Heat resistant properties are materially affected adversely when too large amounts of the cure accelerator, e. g., benzoyl peroxide, are employed.

What we claim as new and desire to secure by Letters Patent of the United States is:

1. A composition of matter comprising (1) a titanium dioxide-filled organopolysiloxane convertible to the cured, solid, elastic state in which the organic groups are selected from the class consisting of alkyl, aryl, aralkyl, and alkaryl radicals, the said organic groups being present in the ratio of from about 1.98 to 2.2 organic groups per silicon atom, (2) a curing agent for (1) selected from the class consisting of benzoyl peroxide and tertiary butyl perbenzoate, and (3) an organic peroxide compound present in an amount up to 0.5%, by weight, based on the weight of the organopolysiloxane, the said organic peroxide compound being selected from the class consisting of ditertiary butyl diperphthalate, tertiary butyl hydroperoxide, dipersuccinic acid, ditertiary butyl diperadipate, and ditertiary butyl dipersuccinate.

2. A composition of matter comprising (1) a titanium dioxide-filled methylpolysiloxane containing an average of from about 1.98 to 2.2 methyl groups per silicon atom and being convertible to the solid elastic state, (2) a curing agent for (1) selected from the class consisting of benzoyl peroxide and tertiary butyl perbenzoate, and (3) an organic peroxide compound present in an amount up to 0.5%, by weight, based on the weight of the organopolysiloxane, the said organic peroxide compound being selected from the class consisting of ditertiary butyl diperphthalate, tertiary butyl hydroperoxide, dipersuccinic acid, ditertiary butyl diperadipate, and ditertiary butyl dipersuccinate.

3. A composition of matter comprising (1) a titanium dioxide-filled organopolysiloxane in which the organic groups are selected from the class consisting of alkyl, aryl, aralkyl, and alkaryl radicals and are present in the ratio of from about 1.98 to 2.2 organic groups per silicon atom, the said organopolysiloxane being convertible to the solid elastic state, (2) benzoyl peroxide, and (3) an organic peroxide compound present in an amount up to 0.5%, by weight, based on the weight of the aforesaid organopolysiloxane, the said organic peroxide compound being selected from the class consisting of ditertiary butyl diperphthalate, tertiary butyl hydroperoxide, dipersuccinic acid, ditertiary butyl diperadipate, and ditertiary butyl dipersuccinate.

4. The process for adhering silicone rubber to various surfaces which comprises (1) forming a mixture of ingredients comprising (a) titanium dioxide-filled organopolysiloxane in which the organic groups are selected from the class consisting of alkyl, aryl, aralkyl, and alkaryl radicals and in which there are present an average of from about 1.98 to 2.2 organic groups per silicon atom, the said organopolysiloxane being convertible to the solid elastic state, (b) a curing agent for (a) selected from the class consisting of benzoyl peroxide and tertiary butyl perbenzoate, and (c) an organic peroxide compound present in an amount up to 0.5%, by weight, based on the weight of the organopolysiloxane, the said organic peroxide compound being selected from the class consisting of ditertiary butyl diperphthalate, tertiary butyl hydroperoxide, dipersuccinic acid, ditertiary butyl diperadipate, and ditertiary butyl dipersuccinate, and (2) applying the said mixture of ingredients to the surface to which it is desired to adhere the said filled organopolysiloxane.

5. The method of adhering a silicone rubber to various surfaces which comprises (1) forming a mixture of ingredients comprising (a) a titanium dioxide-filled methylpolysiloxane containing an average from about 1.98 to 2.0 methyl groups per silicon atom and being convertible to the solid elastic state, (b) benzoyl peroxide, and (c) an organic peroxide compound present in an amount up to 0.5%, by weight, based on the weight of the methylpolysiloxane, the said organic peroxide compound being selected from the class consisting of ditertiary butyl diperphthalate, tertiary butyl hydroperoxide, dipersuccinic acid, ditertiary butyl diperadipate, and ditertiary butyl dipersuccinate, (2) applying the aforesaid mixture of ingredients to the surface to which adhesion is desired, and (3) heating the total assembly until a firmly bonded product is obtained.

6. A composition of matter comprising (1) a titanium dioxide-filled methylpolysiloxane containing an average of from about 1.98 to 2.2 methyl groups per silicon atom and being convertible to the solid elastic state, (2) benzoyl peroxide, and (3) ditertiary butyl diperphthalate, the latter being present in an amount up to 0.5%, by weight, based on the weight of the methylpolysiloxane.

7. A composition of matter comprising (1) a titanium dioxide-filled methylpolysiloxane containing an average of from about 1.98 to 2.2 methyl groups per silicon atom and being convertible to the solid elastic state, (2) benzoyl peroxide, and (3) tertiary butyl hydroperoxide, the latter being present in an amount up to 0.5%, by weight, based on the weight of the methylpolysiloxane.

8. A composition of matter comprising (1) a titanium dioxide-filled methylpolysiloxane containing an average of from about 1.98 to 2.2 methyl groups per silicon atom and being convertible to the solid elastic state, (2) benzoyl peroxide, and (3) dipersuccinic acid, the latter being present in an amount up to 0.5%, by weight, based on the weight of the methylpolysiloxane.

9. A composition of matter comprising (1) a titanium dioxide-filled methylpolysiloxane containing an average of from about 1.98 to 2.2 methyl groups per silicon atom and being convertible to the solid elastic state, (2) benzoyl peroxide, and (3) ditertiary butyl diperadipate, the latter being present in an amount up to 0.5%, by weight, based on the weight of the methylpolysiloxane.

10. A composition of matter comprising (1) a titanium dioxide-filled methylpolysiloxane containing an average of from about 1.98 to 2.2 methyl groups per silicon atom and being convertible to the solid elastic state, (2) benzoyl peroxide, and (3) ditertiary butyl dipersuccinate, the latter being present in an amount up to 0.5% by weight, based on the weight of the methylpolysiloxane.

11. The method of adhering a silicone rubber to various surfaces which comprises (1) forming a mixture of ingredients comprising (a) a titanium dioxide-filled methylpolysiloxane containing an average of from about 1.98 to 2.2 methyl groups per silicon atom and being convertible to the solid elastic state, (b) benzoyl peroxide, and (c) tertiary butyl hydroperoxide, the latter being present in an amount up to 0.5%, by weight, based on the weight of the methylpolysiloxane, (2) applying the aforesaid mixture of ingredients to the surface to which adhesion is desired, and (3) heating the total assembly until a firmly bonded product is obtained.

12. The method of adhering a silicone rubber to various surfaces which comprises (1) forming a mixture of ingredients comprising (a) a titanium dioxide-filled methylpolysiloxane containing an average of from about 1.98 to 2.2 methyl groups per silicon atom, and being convertible to the solid elastic state, (b) benzoyl peroxide, and (c) dipersuccinic acid, the latter being present in an amount up to 0.5%, by weight, based on the weight of the methylpolysiloxane, (2) applying the aforesaid mixture of ingredients to the surface to which adhesion is desired, and (3) heating the total assembly until a firmly bonded product is obtained.

13. The method of adhering a silicone rubber to various surfaces which comprises (1) forming a mixture of ingredients comprising (a) a titanium dioxide-filled methylpolysiloxane containing an average of from about 1.98 to 2.2 methyl groups per silicon atom, and being convertible to the solid elastic state, (b) benzoyl peroxide, and (c)

ditertiary butyl diperphthalate, the latter being present in an amount up to 0.5%, by weight, based on the weight of the methylpolysiloxane, (2) applying the aforesaid mixture of ingredients to the surface to which adhesion is desired, and (3) heating the total assembly until a firmly bonded product is obtained.

14. The method of adhering a silicone rubber to various surfaces which comprises (1) forming a mixture of ingredients comprising (a) a titanium dioxide-filled methylpolysiloxane containing an average of from about 1.98 to 2.2 methyl groups per silicon atom, and being convertible to the solid elastic state, (b) benzoyl peroxide, and (c) ditertiary butyl diperadipate, the latter being present in an amount up to 0.5%, by weight, based on the weight of the methylpolysiloxane, (2) applying the aforesaid mixture of ingredients to the surface to which adhesion is desired, and (3) heating the total assembly until a firmly bonded product is obtained.

15. The method of adhering a silicone rubber to various surfaces which comprises (1) forming a mixture of ingredients comprising (a) a titanium dioxide-filled methylpolysiloxane containing an average of from about 1.98 to 2.2 methyl groups per silicon atom, and being convertible to the solid elastic state, (b) benzoyl peroxide, and (c) ditertiary butyl dipersuccinate, the latter being present in an amount up to 0.5%, by weight, based on the weight of the methylpolysiloxane, (2) applying the aforesaid mixture of ingredients to the surface to which adhesion is desired, and (3) heating the total assembly until a firmly bonded product is obtained.

ROBERT SMITH-JOHANNSEN.
CURTIS S. OLIVER.

References Cited in the file of this patent

UNITED STATES PATENTS

| Number | Name | Date |
|---|---|---|
| 2,448,530 | Jones | Sept. 7, 1948 |
| 2,480,620 | Warrick | Apr. 30, 1949 |